(12) United States Patent
Lou et al.

(10) Patent No.: US 11,019,482 B2
(45) Date of Patent: May 25, 2021

(54) METHOD, SYSTEM, AND TERMINAL DEVICE FOR REALIZING LOCAL PROFILE ASSISTANT BASED ON REMOTE SUBSCRIBER IDENTIFICATION MODULE PROVISIONING

(71) Applicant: TCL Communications (Ningbo) Co., Ltd., Ningbo (CN)

(72) Inventors: Xianghui Lou, Ningbo (CN); Xian Jiang, Ningbo (CN)

(73) Assignee: TCL Communications (Ningbo) Co., Ltd., Ningbo (CN)

( * ) Notice: Subject to any disclaimer, the term of this patent is extended or adjusted under 35 U.S.C. 154(b) by 0 days.

(21) Appl. No.: 16/486,838

(22) PCT Filed: Feb. 8, 2018

(86) PCT No.: PCT/CN2018/075750
§ 371 (c)(1),
(2) Date: Aug. 19, 2019

(87) PCT Pub. No.: WO2018/149356
PCT Pub. Date: Aug. 23, 2018

(65) Prior Publication Data
US 2020/0252788 A1     Aug. 6, 2020

(30) Foreign Application Priority Data

Feb. 17, 2017  (CN) .......................... 201710087426.9

(51) Int. Cl.
*H04W 8/20*      (2009.01)
*H04W 8/24*      (2009.01)
(Continued)

(52) U.S. Cl.
CPC .......... *H04W 8/205* (2013.01); *H04W 8/245* (2013.01)

(58) Field of Classification Search
CPC ..... H04W 8/205; H04W 8/245; H04W 48/08; H04W 48/18
See application file for complete search history.

(56) References Cited

U.S. PATENT DOCUMENTS

2016/0006728 A1   1/2016 Park et al.
2018/0070224 A1   3/2018 Park et al.
(Continued)

FOREIGN PATENT DOCUMENTS

CN        106851621       6/2017
EP          2963955       1/2016
(Continued)

OTHER PUBLICATIONS

International Search Report and Written Opinion dated May 4, 2019 From the International Searching Authority Re. Application No. PCT/CN2018/075750. (5 Pages).

(Continued)

*Primary Examiner* — Yuwen Pan
*Assistant Examiner* — Hung K Du

(57) ABSTRACT

Disclosed is a RSP-based LPA application implementation method, comprising: pre-setting an LPA of a terminal side, wherein the LPA is a local configuration proxy; when information about a subscription protocol between the terminal side and an operator is detected, an operator server creating, according to proxy information about the LPA, a corresponding operator data packet; the terminal side accessing the operator server, and downloading, according to the proxy information, the corresponding operator data packet; and an EUICC receiving the operator data packet forwarded by the LPA, decrypting same, and then installing the operator data packet, wherein the EUICC is an embedded universal integrated circuit card.

9 Claims, 2 Drawing Sheets

(51) Int. Cl.
*H04W 48/08* (2009.01)
*H04W 48/18* (2009.01)

(56) References Cited

U.S. PATENT DOCUMENTS

| | | |
|---|---|---|
| 2018/0131699 A1 | 5/2018 | Park et al. |
| 2018/0302781 A1* | 10/2018 | Lee .................. H04W 12/0609 |
| 2019/0253563 A1* | 8/2019 | Ullah .................. H04M 15/705 |
| 2019/0373448 A1* | 12/2019 | Gao ........................ H04W 8/20 |

FOREIGN PATENT DOCUMENTS

| | | |
|---|---|---|
| WO | WO 2016/153281 | 9/2016 |
| WO | WO 2016/167551 | 10/2016 |
| WO | WO 2018/149356 | 8/2018 |

OTHER PUBLICATIONS

Sanz "RSP Technical Specification, Version 2.0", GSM Association, Official Document SGP.22, p. 1-230, Oct. 14, 2016.

Yang et al. "Analysis and Suggestions on Key Problems of Telecom Operators' eUICC Development", Guangdong Institute of Communications, Symposium, p. 158-165, Dec. 2015. English Abstract.

* cited by examiner

METHOD, SYSTEM, AND TERMINAL DEVICE FOR REALIZING LOCAL PROFILE ASSISTANT BASED ON REMOTE SUBSCRIBER IDENTIFICATION MODULE PROVISIONING

RELATED APPLICATIONS

This application is a National Phase of PCT Patent Application No. PCT/CN2018/075750 having International filing date of Feb. 8, 2018, which claims the benefit of priority of Chinese Patent Application No. 201710087426.9 filed on Feb. 17, 2017. The contents of the above applications are all incorporated by reference as if fully set forth herein in their entirety.

BACKGROUND OF INVENTION

Field and Background of the Invention

The present invention relates to a technical field of communication technologies, and more particularly, to a method, a system, and a terminal device for realizing local profile assistant (LPA) based on remote subscriber identification module provisioning (RSP).

Currently, 2FF, 3FF, and 4FF types subscriber identification module (SIM) cards which are commonly used in mobile communication systems, do not have significant technological evolution other than in an aspect of a card size, and cannot meet the requirements of terminal device miniaturization or be adapted to more complex application scenarios. Embedded universal integrated circuit cards (EUICC) emerge accordingly.

SUMMARY OF THE INVENTION

The invention provides a method and a system for realizing local profile assistant (LPA) based on remote subscriber identification module provisioning (RSP), to address the shortcomings of the 2FF, 3FF and 4FF types SIM card in meeting the requirements of terminal device miniaturization and adapting to more complex application scenarios.

Technical schemes of the invention are as the following:

A method for realizing local profile assistant (LPA) based on remote subscriber identification module provisioning (RSP), comprising following steps of:

pre-configuring an LPA at a terminal side, wherein the LPA is a local profile assistant;

creating corresponding operator profile package by an operator server according to agent information of the LPA when a subscription related message between the terminal side and an operator is detected by the operator server;

accessing to the operator server and downloading the corresponding operator profile package by the terminal side according to the agent information; and receiving the operator profile package forwarded from LPA, decrypting and installing the operator profile package by an embedded universal integrated circuit card (EUICC), wherein the EUICC is an embedded universal integrated circuit card.

The method for realizing LPA based on RSP further comprising:

when an enable instruction, a disable instruction, a switch instruction, or a delete instruction for a provisioning profile is detected, executing a corresponding operation on the provisioning profile according to the detected enable instruction, the disable instruction, the switch instruction, or the delete instruction.

The method for realizing LPA based on RSP wherein in the step of creating the corresponding operator profile package by the operator server according to the agent information of the LPA when the subscription related message between the terminal side and the operator is detected by the operator server, the operator server replies a two-dimensional bar code to the terminal side, or replies an activation code and a subscription manager-data preparation plus (SM-DP+) server address to the terminal side, or the operator server replies a target EUICC provided subscriber configuration event and the SM-DP+ server address to the terminal side when the subscription related message between the terminal side and the operator is detected, wherein the two-dimensional bar code includes the SM-DP+ server address and download information of the operator profile package.

The method for realizing LPA based on RSP, wherein the step of accessing to the operator server and downloading the corresponding operator profile package by the terminal side according to the agent information comprises:

determining whether one of a WIFI connection instruction, a pre-installed operation file startup instruction, or a provisioning profile startup instruction is detected by the terminal side;

connecting to a SM-DP+ server over a WIFI network and downloading the corresponding operator profile package by the LPA when the terminal side detects the WIFI connection instruction;

connecting to the corresponding operator server through a carrier network corresponding to a pre-installed operation file, and downloading the corresponding operator profile package by the LPA when the terminal side detects the pre-installed operation file startup instruction; and connecting to the corresponding operator server according to a provisioning profile and downloading the corresponding operator profile package by the LPA when the terminal side detects the provisioning profile startup instruction.

A system for realizing local profile assistant (LPA) based on remote subscriber identification module provisioning (RSP), comprising:

one or more processors;

a memory; and one or more applications stored in the memory and configured to be executed by the processor, wherein the one or more applications comprise:

an LPA configuration module configured to pre-configure an LPA at a terminal side, wherein the LPA is a local profile assistant;

an operator profile package creating module configured to create a corresponding operator profile package by an operator server according to agent information of the LPA when detecting a subscription related message between the terminal side and an operator;

a download module configured to access to the operator server and download the corresponding operator profile package by the terminal side according to the agent information; and a decrypting and installing module configured to receive the operator profile package forwarded from LPA, decrypt and install the operator profile package by an embedded universal integrated circuit card (EUICC), wherein the EUICC is an embedded universal integrated circuit card.

The system for realizing LPA based on RSP further comprises:

an LPA management module configured to, when detecting an enable instruction, a disable instruction, a switch instruction, or a delete instruction for a provisioning profile, execute a corresponding operation on the provisioning profile according to the detected enable instruction, the disable instruction, the switch instruction, or the delete instruction.

The system for realizing LPA based on RSP, wherein the operator server replies a two-dimensional bar code to the terminal side, or replies an activation code and SM-DP+ server address to the terminal side, or the operator server replies a target EUICC provided subscriber configuration event and the SM-DP+ server address to the terminal side when the operator profile package creating module detects the subscription related message between the terminal side and the operator, wherein the two-dimensional bar code includes the SM-DP+ server address and download information of the operator profile package.

The system for realizing LPA based on RSP, wherein the download module further comprises:

a decision module configured to determine whether one of a WIFI connection instruction, a pre-installed operation file startup instruction, or a provisioning profile startup instruction is detected by the terminal side;

a first connecting module configured to connect to a SM-DP+ server over a WIFI network and download the corresponding operator profile package by the LPA when the terminal side detects the WIFI connection instruction;

a second connecting module configured to connect to the corresponding operator server through a carrier network corresponding to a pre-installed operation file, and download the corresponding operator profile package by the LPA when the terminal side detects the pre-installed operation file startup instruction; and a third connecting module configured to connect to the corresponding operator server according to a provisioning profile and download the corresponding operator profile package by the LPA when the terminal side detects the provisioning profile startup instruction.

A terminal device comprising:

a processor and a memory, wherein the memory stores data and instructions, and the processor executes the following steps:

pre-configuring a local profile assistant (LPA) at a terminal side via a setting menu interface or a setting application, to create a corresponding operator profile package by an operator server according to agent information of the LPA when a subscription related message between the terminal side and an operator is detected by the operator server;

accessing to the operator server and downloading the corresponding operator profile package by the terminal side according to the agent information; and receiving the operator profile package forwarded from LPA, decrypting and installing the operator profile package by an embedded universal integrated circuit card (EUICC), wherein the EUICC is an embedded universal integrated circuit card.

The terminal device further comprising:

when an enable instruction, a disable instruction, a switch instruction, or a delete instruction for a provisioning profile is detected, executing a corresponding operation on the provisioning profile according to the detected enable instruction, the disable instruction, the switch instruction, or the delete instruction.

The terminal device, wherein in the step of creating the corresponding operator profile package by the operator server according to the agent information of the LPA when the subscription related message between the terminal side and the operator is detected by the operator server, the operator server replies a two-dimensional bar code to the terminal side, or replies an activation code and SM-DP+ server address to the terminal side, or the operator server replies a target EUICC provided subscriber configuration event and the SM-DP+ server address to the terminal side when the subscription related message between the terminal side and the operator is detected, wherein the two-dimensional bar code includes the SM-DP+ server address and download information of the operator profile package.

The terminal device, wherein the step of accessing to the operator server and downloading the corresponding operator profile package by the terminal side according to the agent information comprises:

determining whether one of a WIFI connection instruction, a pre-installed operation file startup instruction, or a provisioning profile startup instruction is detected by the terminal side;

connecting to a SM-DP+ server over a WIFI network and downloading the corresponding operator profile package by the LPA when the terminal side detects the WIFI connection instruction;

connecting to the corresponding operator server through a carrier network corresponding to a pre-installed operation file, and downloading the corresponding operator profile package by the LPA when the terminal side detects the pre-installed operation file startup instruction; and connecting to the corresponding operator server according to a provisioning profile and downloading the corresponding operator profile package by the LPA when the terminal side detects the provisioning profile startup instruction.

Useful Effects:

The invention provides a method, a system, and a terminal device for realizing LPA based on RSP which includes: pre-configuring an LPA at a terminal side, wherein the LPA is a local profile assistant; creating a corresponding operator profile package by an operator server according to agent information of the LPA when a subscription related message between the terminal side and an operator is detected by the operator server; accessing to the operator server and downloading the corresponding operator profile package by the terminal side according to the agent information; receiving the operator profile package forwarded from LPA, decrypting and installing the operator profile package by an embedded universal integrated circuit card (EUICC), wherein the EUICC is an embedded universal integrated circuit card. The invention realizes an LPA-based method to achieve remote user configuration and management of EUICC, and the EUICC can effectively reduce a size of a terminal device and is suitable for more complex application scenarios.

DESCRIPTION OF SPECIFIC EMBODIMENTS OF THE INVENTION

The invention provides a method and a system for realizing local profile assistant (LPA) based on remote subscriber identification module provisioning (RSP). To make the objectives, technical schemes, and technical effects of the present invention more clear and definite, the present invention is detailed below. It should be understood that the specific embodiments described herein are merely for explaining the present invention and are not intended to limit the present invention.

Figure 1:
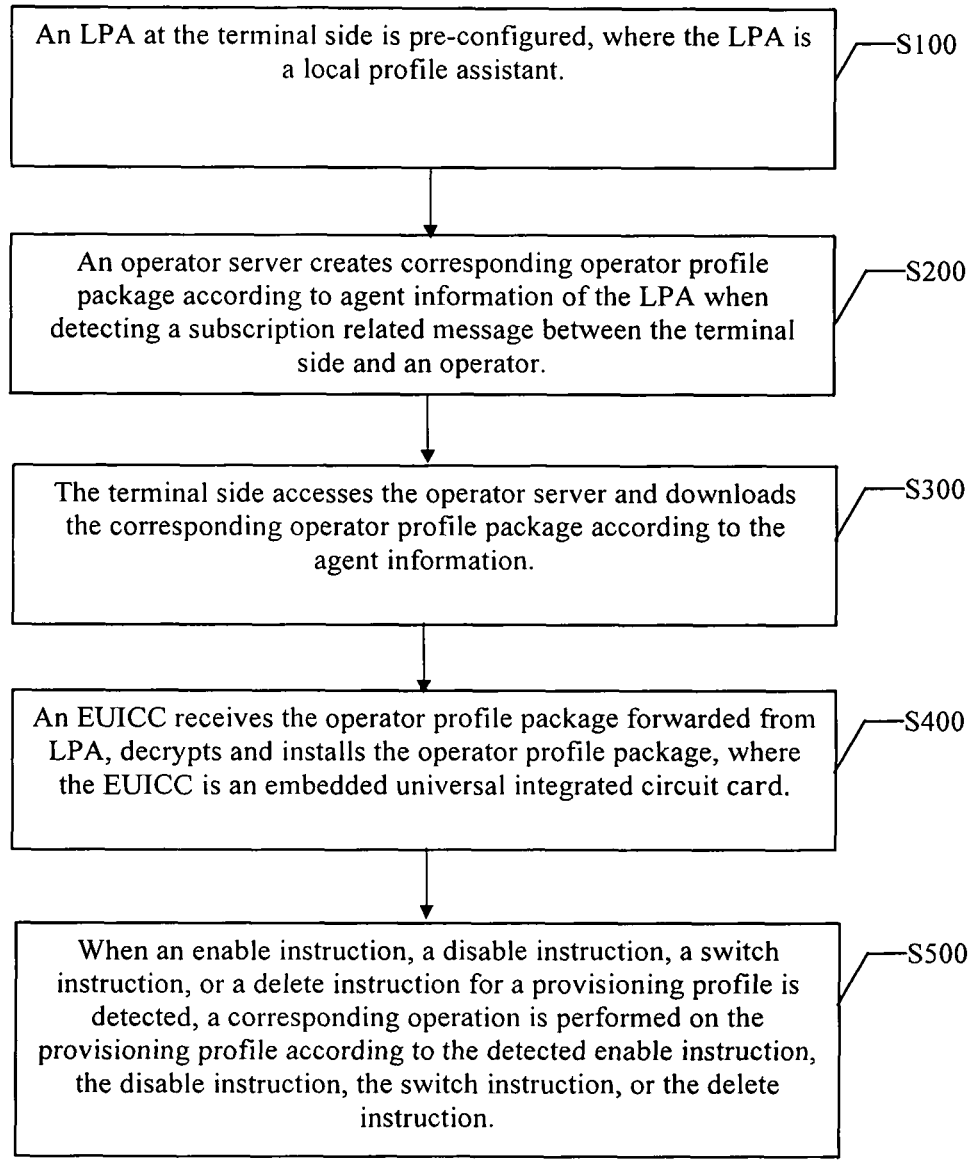
FIG. 1 is a flowchart of a method for realizing local profile assistant (LPA) based on remote subscriber identification module provisioning (RSP) of a preferred embodiment.

FIG. 1 is a flowchart showing a preferred embodiment of a method for realizing LPA based on RSP. The method includes the following steps:

In step S100, an LPA at a terminal side is pre-configured, where the LPA is a local profile assistant.

In the present invention, the remote configuration and management of embedded universal integrated circuit card (EUICC) is realized based on RSP. The full name of the RSP is remote SIM provisioning, which is remote SIM card configuration and management. The RSP is defined by Global System for Mobile communications Association (GSMA) as a standard and mechanism for implementing a function of remote provisioning of operator profile on the EUICC.

The full name of EUICC is embedded universal integrated circuit card. The EUICC is a universal integrated circuit card (UICC) defined by the GSMA/European Telecommunications Standards Institute (ETSI) standard organization, which is installed and not easily replaceable in an embedded device, and has secure remote provisioning capabilities. Remote provisioning includes remote download, enabling, disabling, switching, and deletion of an operator profile.

The full name of LPA is local profile assistant, known as a local configuration agent being a key component of the RSP system framework defined by the GSMA. LPA mainly contains three functions as detailed in the following:

Local discovery service (LDS) which discovers profile events and addresses of a profile from a server for provisioning to an EUICC.

Local profile download (LPD) which acts as a proxy between the EUICC and a subscription manager-data preparation plus (SM-DP+) servers, downloads, and retrieves a profile package from the SM-DP+ server, and then moves the profile package to the EUICC.

Local User Interface (LUI) which provides on-premises profile management functions for end users, including profile enabling, disabling, switching, deletion, and more.

In an embodiment of the steps S100 of the present invention, configuring LPA at the terminal side may mainly be achieved via two ways: setting a configuration menu and setting via an application (APP). Both of these configuration approaches can be arranged to achieve mature solutions that provide rich and flexible user interfaces for interacting with an end user to match end user habits. LPA settings may be realized by setting the interface of the menu or the APP.

In step S200, an operator server creates a corresponding operator profile package according to agent information of the LPA when detecting a subscription related message between the terminal side and an operator.

In an embodiment, an operator profile package includes an international mobile subscriber identification number (IMSI) and a key identifier (KI) which is an encryption key for communication between the SIM card and the operator. Thus, when a subscription related message between the terminal side and an operator is detected, stating that the terminal side is requesting operator profile in order to write the operator profile to the EUICC card on the terminal side and realize EUICC function as a substitute for a SIM card.

In step S200,

In step S300, the terminal side accesses the operator server and downloads the corresponding operator profile package according to the agent information.

When the terminal side accesses the operator server, the LPA retrieves operator profile package and complete downloading the operator profile package.

In step S400, an EUICC receives the operator profile package forwarded from LPA, decrypts and installs the operator profile package, where the EUICC is an embedded universal integrated circuit card.

Packaging of an EUICC (that is, an embedded UICC card) currently has two forms, one is using surface-mounted (SMD) patch packaging process to directly weld an SIM card chip in a machine to machine (M2M) terminal module, the other is using a simple in package (SIP) packaging process to encapsulate an SIM card chip with a chip in a terminal module to form only one chip, as if no SIM cards visible. The current industry-defined embedded UICC card is used in M2M devices, while a broader definition of an embedded UICC card is a non-pluggable SIM card that can be used in any terminal devices, with a most significant difference from a regular SIM card being that an EUICC is fixed in a terminal and cannot be replaced by a user. Accordingly, no SIM card slot is needed in a terminal device, which provides a prerequisite for terminal miniaturization.

Further, the method for realizing LPA based on RSP further includes:

In step S500, when an enable instruction, a disable instruction, a switch instruction, or a delete instruction for a provisioning profile is detected, a corresponding operation is performed on the provisioning profile according to the detected enable instruction, the disable instruction, the switch instruction, or the delete instruction.

Specifically, an LPA user interface for the LPA may be provided for setting of a provisioning profile. The main functional modules in the LPA user interface include modules for: profile download, enabling, disabling, switching, listing, deletion, getting EUICC identifier (ID), setting a profile alias, and resetting EUICC. Thus, the LPA user interface may be flexibly customized according to specific needs of users.

Preferably, in the step S200 of creating the corresponding operator profile package by the operator server according to the agent information of the LPA when the subscription related message between the terminal side and the operator is detected by the operator server, the operator server replies a two-dimensional bar code to the terminal side, or replies an activation code and SM-DP+ server address to the terminal side, or the operator server replies a target EUICC provided subscriber configuration event and the SM-DP+ server address to the terminal side when the subscription related message between the terminal side and the operator is detected, where the two-dimensional bar code includes the SM-DP+ server address and download information of the operator profile package.

Specifically, in a first example, when a user has reached an agreement with an operator on user subscription, that is, when the subscription related message between the terminal side and the operator is detected, the operator provides a two-dimensional bar code to the user. The two-dimensional bar code includes an address of an SM-DP+ server and download information of the operator profile package which is customized for the user. The user may open the LPA user interface, scan the two-dimensional bar code to connect to the SM-DP+ server and download the customized operator profile package.

In a second example, when a user has reached an agreement with an operator on user subscription, that is, when the subscription related message between the terminal side and the operator is detected, the operator provides an activation code and an address of an SM-DP+ server to the user. The user may manually enter the activation code and the SM-DP+ server address into the LPA user interface to connect to the SM-DP+ server and download the customized operator profile package.

In a third example, when a user has reached an agreement with an operator on user subscription, that is, when the subscription related message between the terminal side and the operator is detected, the SM-DP+ server creates corresponding operator profile package and signifies completion of the creation of the corresponding operator profile package customized for the target EUICC. A local discovery service in the LPA of the terminal side periodically searches and discovers subscriber configuration events and server address for the target EUICC. The LPA then connects to the SM-DP+ server and downloads the customized operator profile package.

Of course, the way the LPA accessing the operator server is not limited to the three examples described, and can be realized in various embodiments where accessing to the operator server by the LPA is triggered by a subscription related message between the terminal side and the operator.

Preferably, the step S300 further includes:

Step S301 of determining whether one of a WIFI connection instruction, a pre-installed operation file startup instruction, or a provisioning profile startup instruction is detected by the terminal side;

Step S302 of connecting to a SM-DP+ server over a WIFI network and downloading the corresponding operator profile package by the LPA when the terminal side detects the WIFI connection instruction;

Step S303 of connecting to the corresponding operator server through a carrier network corresponding to a pre-installed operation file, and downloading the corresponding operator profile package by the LPA when the terminal side detects the pre-installed operation file startup instruction; and Step S304 of connecting to the corresponding operator server according to a provisioning profile and downloading the corresponding operator profile package by the LPA when the terminal side detects the provisioning profile startup instruction.

That is, a network connection required for the LPA to connect to the operator server and download operator profile package mainly can be established utilizing three options: a WIFI connection, a connection based on the pre-installed operational profile, and a connection based on the provisioning profile. The network connection can be customized according to specific needs and business models. The following is an introduction to the three options of network connection:

1) WIFI: With a factory manufactured EUICC card being a blank card with no operator profile package, the LPA needs extra networks (such as WIFI) to connect to the SM-DP+ server and perform first download of operator profile package. WIFI can be used as a basic way to connect to the network, ensuring that LPA can connect to the SM-DP+ server to download operator packages. Since WIFI networks may not always be supported in any given environment, for users' convenience, the provisioning profile and the pre-installed operational profile may be utilized as two alternative options to facilitate connecting to the operator server using the LPA anytime and anywhere.

2) Pre-installed Operational profile: A pre-installed operational profile is a formal operator profile package pre-installed in an EUICC before the EUICC is rolled out from a factory. The LPA may use the pre-installed operator profile package to connect to a carrier network operator server through a corresponding carrier network to download other formal operator profile packages, and may use the pre-installed operator profile package to carry out data and voice services. This option is generally used in special business models and scenarios, such as operator customized terminal devices.

3) Provisioning profile: A provisioning profile is an operator profile package with restricted functions, which is pre-installed in an EUICC before the EUICC is rolled out from a factory. The pre-installed operator package enables the LPA to connect to the mobile network, but restrict the LPA to connect to a corresponding operator server to download the official operator profile package, and cannot be used for other data and voice services. The provisioning profile is invisible to users and cannot be removed. The provisioning profile is used to connect to the server in a situation when neither WIFI connection and nor official operator profile package in the EUICC is available.

Accordingly, the invention realizes an LPA-based method to achieve remote user configuration and management of EUICC, and the EUICC can effectively reduce a size of a terminal device and is suitable for more complex application scenarios.

Figure 2:
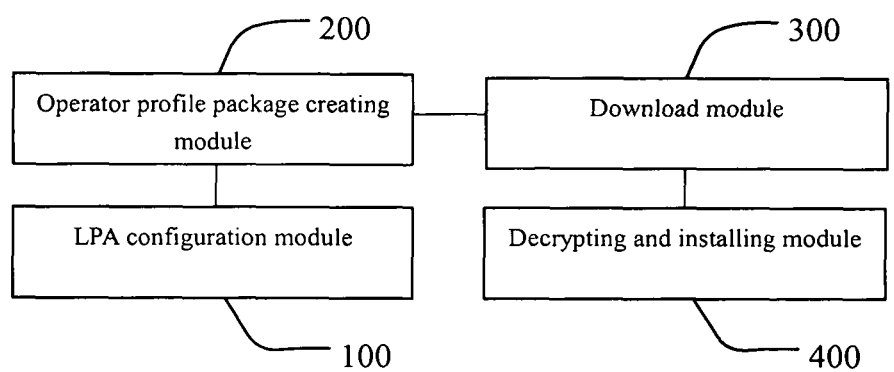
FIG. 2 is a functional block diagram of a system for realizing LPA based on RSP of a preferred embodiment.

Based on the method in the detailed embodiments, the invention further provides a system for realizing LPA based on RSP. As shown in FIG. 2, the system for realizing LPA based on RSP comprises:

an LPA configuration module 100 configured to pre-configure an LPA at a terminal side, wherein the LPA is a local profile assistant;

an operator profile package creating module 200 configured to create a corresponding operator profile package by an operator server according to agent information of the LPA when detecting a subscription related message between the terminal side and an operator;

a download module 300 configured to access to the operator server and download the corresponding operator profile package by the terminal side according to the agent information; and a decrypting and installing module 400 configured to receive the operator profile package forwarded from LPA, decrypt and install the operator profile package by an embedded universal integrated circuit card (EUICC), wherein the EUICC is an embedded universal integrated circuit card.

Preferably, the system for realizing LPA based on RSP further comprises: an LPA management module configured to, when an enable instruction, a disable instruction, a switch instruction, or a delete instruction for a provisioning profile is detected, execute a corresponding operation on the provisioning profile according to the detected enable instruction, the disable instruction, the switch instruction, or the delete instruction.

Preferably, in the system for realizing LPA based on RSP, the operator server replies a two-dimensional bar code to the terminal side, or replies an activation code and SM-DP+ server address to the terminal side, or the operator server replies a target EUICC provided subscriber configuration event and the SM-DP+ server address to the terminal side when the operator profile package creating module 200 detects the subscription related message between the terminal side and the operator, wherein the two-dimensional bar code includes the SM-DP+ server address and download information of the operator profile package.

Preferably, in the system for realizing LPA based on RSP, the download module 300 further comprises:

a decision module configured to determine whether one of a WIFI connection instruction, a pre-installed operation file startup instruction, or a provisioning profile startup instruction is detected by the terminal side;

a first connecting module configured to connect to a SM-DP+ server over a WIFI network and downloading of the corresponding operator profile package by the LPA when the terminal side detects the WIFI connection instruction;

a second connecting module configured to connect to the corresponding operator server through a carrier network corresponding to a pre-installed operation file, and download the corresponding operator profile package by the LPA when the terminal side detects the pre-installed operation file startup instruction; and a third connecting module configured to connect to the corresponding operator server according to a provisioning profile and download the corresponding operator profile package by the LPA when the terminal side detects the provisioning profile startup instruction.

The invention further provides a terminal device, comprising:

a processor and a memory, wherein the memory stores data and instructions, and the processor executes the following steps:

pre-configuring a local profile assistant (LPA) at a terminal side via a setting menu interface or a setting application, to create a corresponding operator profile package by an operator server according to agent information of the LPA when a subscription related message between the terminal side and an operator is detected by the operator server;

accessing the operator server and downloading the corresponding operator profile package by the terminal side according to the agent information; and receiving the operator profile package forwarded from LPA, decrypting and installing the operator profile package by an embedded universal integrated circuit card (EUICC), wherein the EUICC is an embedded universal integrated circuit card.

To sum up, the invention provides a method, a system, and a terminal device for realizing LPA based on RSP which includes: pre-configuring an LPA at a terminal side, wherein the LPA is a local profile assistant; creating a corresponding operator profile package by an operator server according to agent information of the LPA when a subscription related message between the terminal side and an operator is detected by the operator server; accessing to the operator server and downloading the corresponding operator profile package by the terminal side according to the agent information; receiving the operator profile package forwarded from LPA, decrypting and installing the operator profile package by an embedded universal integrated circuit card (EUICC), wherein the EUICC is an embedded universal integrated circuit card. The invention realizes an LPA-based method to achieve remote user configuration and management of EUICC, and the EUICC can effectively reduce a size of a terminal device and is suitable for more complex application scenarios.

One skilled person in the art may understand and implement all or part of the processes in the embodiments through computer programs that instruct relevant hardware to execute the embodiments of the disclosed methods. The computer programs may be stored in a computer readable storage media, which, when executed, may perform the disclosed methods including the processes of the embodiments. The storage media may be disks, discs, read-only memory (ROM), or random access memory (RAM).

It should be understood that application of the present invention is not limited to the above examples, and may be improved or modified by one skilled person in the art according to the teaching described, and all these improvements and modifications should belong to the scope of the claims attached to the present invention.

What is claimed is:

1. A method for realizing local profile assistant (LPA) based on remote subscriber identification module provisioning (RSP), comprising following steps of:

pre-configuring an LPA at a terminal side, wherein the LPA is a local profile assistant;

downloading a corresponding operator profile package by the terminal side according to agent information of the LPA; and receiving the operator profile package forwarded from LPA, decrypting and installing the operator profile package by an EUICC, wherein the EUICC is an embedded universal integrated circuit card;

wherein the step of downloading the corresponding operator profile package by the terminal side according to the agent information comprises:

determining whether one of a WIFI connection instruction, a pre-installed operation file startup instruction, or a provisioning profile startup instruction is detected by the terminal side;

connecting to an SM-DP+ server over a WIFI network and downloading the corresponding operator profile package by the LPA when the terminal side detects the WIFI connection instruction;

connecting to a corresponding operator server through a carrier network corresponding to a pre-installed operation file, and downloading the corresponding operator profile package by the LPA when the terminal side detects the pre-installed operation file startup instruction; and connecting to a corresponding operator server according to a provisioning profile and downloading the corresponding operator profile package by the LPA when the terminal side detects the provisioning profile startup instruction.

2. The method for realizing LPA based on RSP of claim 1 further comprising:

when an enable instruction, a disable instruction, a switch instruction, or a delete instruction for a provisioning profile is detected, executing a corresponding operation on the provisioning profile according to the detected enable instruction, the disable instruction, the switch instruction, or the delete instruction.

3. The method for realizing LPA based on RSP of claim 1, further comprising:

creating the corresponding operator profile package by an operator server according to the agent information of the LPA when a subscription related message between the terminal side and the operator is detected by the operator server, wherein the operator server replies a two-dimensional bar code to the terminal side, or an activation code and a subscription manager-data preparation plus (SM-DP+) server address to the terminal side, or a target EUICC provided subscriber configuration event and the SM-DP+ server address to the terminal side when the subscription related message between the terminal side and the operator is detected, wherein the two-dimensional bar code includes the SM-DP+ server address and download information of the operator profile package.

4. A system for realizing LPA based on RSP, comprising:
one or more processors;
a memory; and
one or more applications stored in the memory and configured to be executed by the processor, wherein the one or more applications comprise:
an LPA configuration module configured to pre-configure an LPA at a terminal side, wherein the LPA is a local profile assistant;
a download module configured to download a corresponding operator profile package by the terminal side according to agent information; and
a decrypting and installing module configured to receive the operator profile package forwarded from LPA, decrypt and install the operator profile package by an EUICC, wherein the EUICC is an embedded universal integrated circuit card;
wherein the download module further comprises:
a decision module configured to determine whether one of a WIFI connection instruction, a pre-installed operation file startup instruction, or a provisioning profile startup instruction is detected by the terminal side;
a first connecting module configured to connect to an SM-DP+ server over a WIFI network and download the corresponding operator profile package by the LPA when the terminal side detects the WIFI connection instruction;
a second connecting module configured to connect to a corresponding operator server through a carrier network corresponding to a pre-installed operation file, and download the corresponding operator profile package by the LPA when the terminal side detects the pre-installed operation file startup instruction; and
a third connecting module configured to connect to a corresponding operator server according to a provisioning profile and download the corresponding operator profile package by the LPA when the terminal side detects the provisioning profile startup instruction.

5. The system for realizing LPA based on RSP of claim 4, wherein the one or more applications further comprise:
an LPA management module configured to, when detecting an enable instruction, a disable instruction, a switch instruction, or a delete instruction for a provisioning profile, execute a corresponding operation on the provisioning profile according to the detected enable instruction, the disable instruction, the switch instruction, or the delete instruction.

6. The system for realizing LPA based on RSP of claim 4, wherein an operator server replies a two-dimensional bar code to the terminal side, or an activation code and an SM-DP+ server address to the terminal side, or a target EUICC provided subscriber configuration event and the SM-DP+ server address to the terminal side when the operator profile package creating module detects a subscription related message between the terminal side and the operator, wherein the two-dimensional bar code includes the SM-DP+ server address and download information of the operator profile package.

7. A terminal device, comprising:
a processor and a memory, wherein the memory stores data and instructions, and the processor executes the following steps:
downloading a corresponding operator profile package by the terminal side according to agent information of the LPA; and
receiving the operator profile package forwarded from LPA, decrypting and installing the operator profile package by an EUICC, wherein the EUICC is an embedded universal integrated circuit card;
wherein the step of downloading the corresponding operator profile package by the terminal side according to the agent information comprises:
determining whether one of a WIFI connection instruction, a pre-installed operation file startup instruction, or a provisioning profile startup instruction is detected by the terminal side;
connecting to an SM-DP+ server over a WIFI network and downloading the corresponding operator profile package by the LPA when the terminal side detects the WIFI connection instruction;
connecting to a corresponding operator server through a carrier network corresponding to a pre-installed operation file, and downloading the corresponding operator profile package by the LPA when the terminal side detects the pre-installed operation file startup instruction; and
connecting to a corresponding operator server according to a provisioning profile and downloading the corresponding operator profile package by the LPA when the terminal side detects the provisioning profile startup instruction.

8. The terminal device of claim 7 further comprising:
when an enable instruction, a disable instruction, a switch instruction, or a delete instruction for a provisioning profile is detected, executing a corresponding operation on the provisioning profile according to the detected enable instruction, the disable instruction, the switch instruction, or the delete instruction.

9. The terminal device of claim 7, further comprising:
creating the corresponding operator profile package by an operator server according to the agent information of the LPA when a subscription related message between the terminal side and the operator is detected by the operator server;
replying by the operator server a two-dimensional bar code to the terminal side, or an activation code and a subscription manager-data preparation plus (SM-DP+) server address to the terminal side, or a target EUICC provided subscriber configuration event and the SM-DP+ server address to the terminal side when the subscription related message between the terminal side and the operator is detected, wherein the two-dimensional bar code includes the SM-DP+ server address and download information of the operator profile package.

* * * * *